United States Patent [19]

Romano

[11] Patent Number: 5,419,218
[45] Date of Patent: May 30, 1995

[54] SAFETY PEDAL FOR BICYCLES AND THE LIKE

[75] Inventor: Antonio Romano, Padova, Italy

[73] Assignee: Campagnolo S.r.l., Vicenza, Italy

[21] Appl. No.: 81,152

[22] Filed: Jun. 25, 1993

[30] Foreign Application Priority Data

Nov. 4, 1992 [IT] Italy ................. TO92A0900

[51] Int. Cl.$^6$ ............... B62M 3/08; G05G 1/14
[52] U.S. Cl. ...................... 74/594.6; 36/131
[58] Field of Search ........... 74/594.4, 594.6, 560; 36/131, 132, 134

[56] References Cited

U.S. PATENT DOCUMENTS

| | | | |
|---|---|---|---|
| 4,762,019 | 8/1988 | Beyl | 74/594.6 |
| 4,840,086 | 6/1989 | Bidal | 74/594.6 |
| 4,882,946 | 11/1989 | Beyl | 74/594.6 |
| 4,898,064 | 2/1990 | Romano | 74/594.6 |
| 4,936,164 | 6/1990 | Forké | 74/594.6 |
| 5,131,291 | 7/1992 | Beyl | 74/594.6 |

FOREIGN PATENT DOCUMENTS

| | | | |
|---|---|---|---|
| 531873 | 3/1993 | European Pat. Off. | 74/594.6 |
| 2-53688 | 2/1990 | Japan | 74/594.4 |
| 3-248987 | 11/1991 | Japan | 74/594.4 |

*Primary Examiner*—Richard M. Lorence
*Attorney, Agent, or Firm*—Sughrue, Mion, Zinn, Macpeak & Seas

[57] ABSTRACT

A safety pedal for bicycles includes a spring which includes a retaining arm for locking a metal plate fixed to a shoe sole on the pedal. The spring includes a spiral portion which holds the retaining arm in the locking position. Furthermore, from the spiral portion there extends a single radial arm, arranged on one side with respect to the longitudinal median plane of the pedal, which acts as a torsion bar for allowing swinging movements of the retaining arm when the plate is rotated in the general plane of the pedal to release the plate from the pedal.

9 Claims, 5 Drawing Sheets

SAFETY PEDAL FOR BICYCLES AND THE LIKE

BACKGROUND OF THE INVENTION

The present invention relates to safety pedals for bicycles and the like, of the type comprising means for quick coupling with a plate fixed to a shoe sole. Safety pedals of the above indicated type have been known for sometime, in which said quick coupling means comprise:

a toe element for receiving the front end of the plate, preventing a forward movement and an upward movement of the plate, and a spring including a spiral portion having an axis parallel to the pedal axis and having a retaining portion for locking the rear end of the plate, preventing rearward, upward and sideward movements of the plate, wherein said retaining portion of the spring and the plate have cam-like cooperating surfaces for snap locking the plate following an introduction of the front end thereof into the toe element and the subsequent lowering of the rear portion of the plate against the retaining portion, as well as for releasing the plate following a rotation of the plate in the general plane of the pedal, i.e. in a plane parallel to the plane of the pedal on which the shoe rests, around the toe element.

Safety pedals of the type indicated above are well known and are described for example in European Patents Nos. 169.080 and 424.210.

SUMMARY OF THE INVENTION

The object of the present invention is that of providing a safety pedal of this type which is improved with respect to its reliability of operation and at the same time is of simpler construction and hence of a relatively low cost.

In order to achieve this object, the invention provides a pedal of the type indicated above, characterised in that said spring includes a single radial arm, extending radially with respect to the spiral axis from one end thereof, said arm being located on one side, towards the inside of the bicycle in the pedal mounted condition, with respect to the longitudinal median plane of the pedal, said retaining portion comprising a second arm projecting in a cantilever fashion from the end of said radial arm, along a transverse direction with respect to the longitudinal median plane of the pedal.

Due to such features, the safety pedal according to the invention gives optimum results with respect to efficiency in operation and reliability, although having a very simple structure and comprised of a reduced number of parts. In particular, the spring of the pedal according to the invention simultaneously fulfils many functions. In the first place, it includes the retaining portion of the plate. Secondly, it includes the spiral spring for biassing the retaining portion towards the locking position. Finally, the same spring includes also a torsion bar, formed by said radial arm, for opposing a rotation of the plate in the general plane of the pedal tending to release the plate itself from the pedal. When the plate is coupled to the pedal, after that the front end of the plate has been placed against the toe element and the rear end of the plate has been lowered, the spiral portion of the spring is subject to deflection, in the conventional way, so as to allow swinging movement of the radial arm around the axis of the spiral and the following snap locking of the retaining portion over the plate. When instead the plate is rotated in the general plane of the pedal in order to cause its release, the spiral of the spring is not substantially stressed, whereas the radial arm operates as a torsion spring, so as to allow a swinging movement of the retaining portion substantially around the axis of the radial arm acting as a torsion bar.

According to a further feature, said retaining portion of the spring further extends with a terminal portion bent in such a way as to define an end portion parallel to the retaining portion and cooperating with an abutment element mounted on the pedal in a position adjustable along a transverse direction with respect to the longitudinal median plane of the pedal.

In a preferred embodiment, said retaining portion of the spring is comprised of a transverse arm having a substantially V-like configuration lying in a plane parallel to the general plane of the pedal and having its apex facing rearwardly, said portion being for cooperation with a rear end of the plate including a base foot and a projecting wedge portion having its apex facing rearwardly.

Naturally, the present invention also provides the pedal-shoe coupling device, including the above described pedal and the plate cooperating therewith. In one variant, the arrangement which has been described above is provided on each of the two main faces of the pedal, according to a technique known *per se*. In such a case, the invention is however further characterised in that the spring provided for retaining the plate on each respective face of the pedal includes a portion which acts as toe element for the opposed face.

BRIEF DESCRIPTION OF THE DRAWINGS

Further features and advantages of the invention will become apparent from the following description with reference to the annexed drawings, given purely by way of non limiting example, in which.

DETAILED DESCRIPTION OF THE INVENTION

Figure 1:
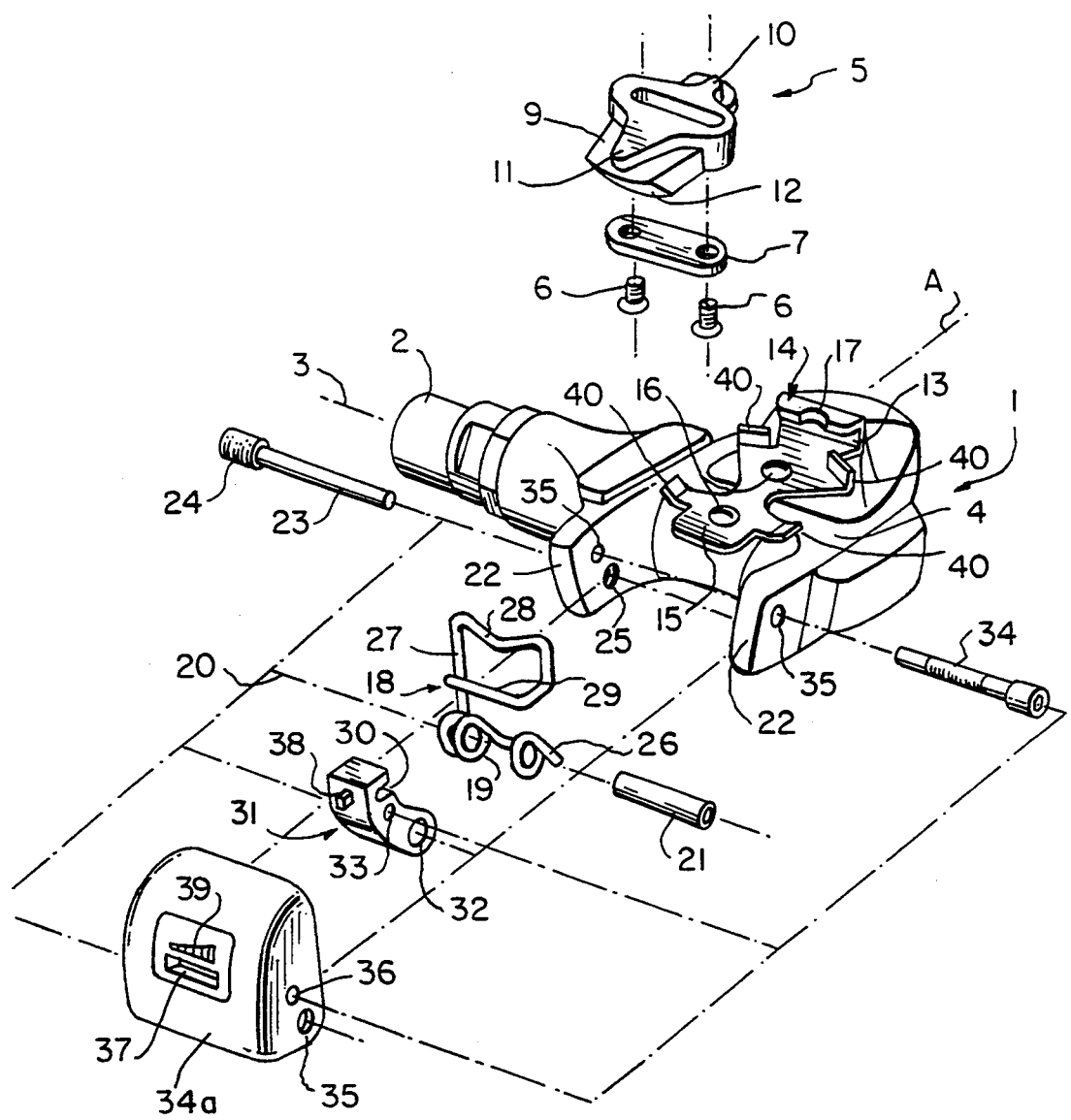
FIG. 1 is a perspective exploded view of a preferred embodiment of the invention.

In FIG. 1, reference numeral 1 generally indicates the body of a bicycle pedal, made for example of light alloy.

The structure of the pedal body is not described in detail herein, since it can be made in any known way and does not fall within the scope of the present invention. According to the conventional technique, the body 1 of the pedal is mounted on a pin 2 which is to be connected to the corresponding crank whose axis 3 will be briefly defined in the following as "pedal axis". The body 1 has an upper surface 4 defining the plane of the pedal on which the shoe rests. This plane will be defined in the following description and claims as "general plane of the pedal". Also with reference to the terms used in the present description and in the claims, the term "longitudinal median plane of the pedal" is used to indicate a plane perpendicular to axis 3 and containing the median axis A of body 1. Reference numeral 5 designates a metal plate, for example of steel or a light alloy, fixed by screws 6 and a plate 7 to the sole 8 (see FIGS. 2, 3) of a cyclist shoe. The plate 5 has a base foot 9 which has upper wedge projecting portions 10, 11 at its front and rear end, oriented respectively with their apex forwardly and rearwardly. The rear end of the plate 5 also has a chamfered lower surface 12.

The front end of plate 5 is to be received in seat 13 of a toe member 14 provided on the pedal 1. In the illustrated example, the toe member 14 is constituted of a portion of a sheet metal element 15 fixed by screws 16 to the upper face 4 of the pedal. The front end of the sheet metal element 15 has a front edge bent upwardly and rearwardly so as to define the seat 13. This front edge has one end edge with a central notched part 17 which is for receiving the apex of wedge 10, whereas the base foot 9 of the plate is to be inserted in seat 13 (see also FIG. 2).

The pedal 1 is provided with a spring 18 which fulfils various functions, as will become apparent in the following. The spring 18 includes a spiral portion 19 having its axis 20 directed transversally with respect to the longitudinal median plane of the pedal. The spiral portion 19 is mounted around a sleeve 21 which extends between two wings 22 projecting rearwardly from body 1 of the pedal, by a pin 23. The pin 23 is fixed to the two wings 22 by a threaded portion 24 thereof which engages a threaded hole 25 of one wing 22. The spiral portion 19 has one end 26 (see also FIGS. 2, 3) which rests against the body of the pedal and the opposite end which forms a single radial arm 27 extending radially with respect to axis 20 along a direction substantially orthogonal to the general plane of the main face 4 of the pedal. The arm 27 is located on one side with respect to the longitudinal median plane of the pedal, and precisely on the side which is to face the inside of the bicycle in the pedal mounted condition. From the upper end of the radial arm 27 there projects in a cantilever fashion a further arm 28 which is to form the retaining portion of the rear end of the plate 5. The arm 28 projects in a cantilever fashion from the upper end of the radial arm 27 and extends along a transverse direction with respect to the longitudinal median plane of the pedal. In the preferred embodiment which is illustrated, furthermore, the arm 28 further extends with an end portion bent so as to define a terminal arm 29 substantially parallel to arm 28 and reacting against an abutment surface 30 (FIG. 4) of an element 31 which is mounted on the pedal in a position adjustable along a transverse direction with respect to the longitudinal median plane of the pedal. In particular, in the illustrated example, the element 31 has a through hole 32 for its slidable mounting over the sleeve 21 and a further threaded hole 33 for engagement of an adjustment screw 34 which engages also through holes 35 of the wings 22 and is held axially. By acting on screw 34, it is possible to cause a movement of element 31 with respect to sleeve 21 and a resulting variation of the reaction point of the end arm 29 of spring 18.

On the two wings 22 there is mounted a rear cover 34a, having holes 35, 36 for engagement of screws 23, 34 and having a horizontal slot 37 from which there projects a pin 38 of element 31. The outer surface of cover 34a has a graduated scale 39 which allows any determined position of pin 38 to be associated with a desired reaction force of the spring.

Figure 2:
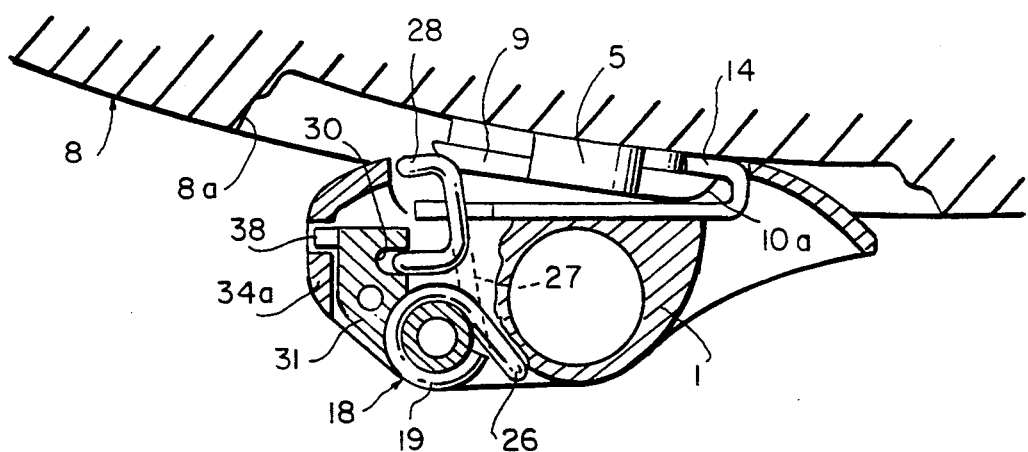
FIGS. 2, 3 show a cross sectional longitudinal view of the pedal according to the invention in two different operative conditions of the pedal.
Figure 3:
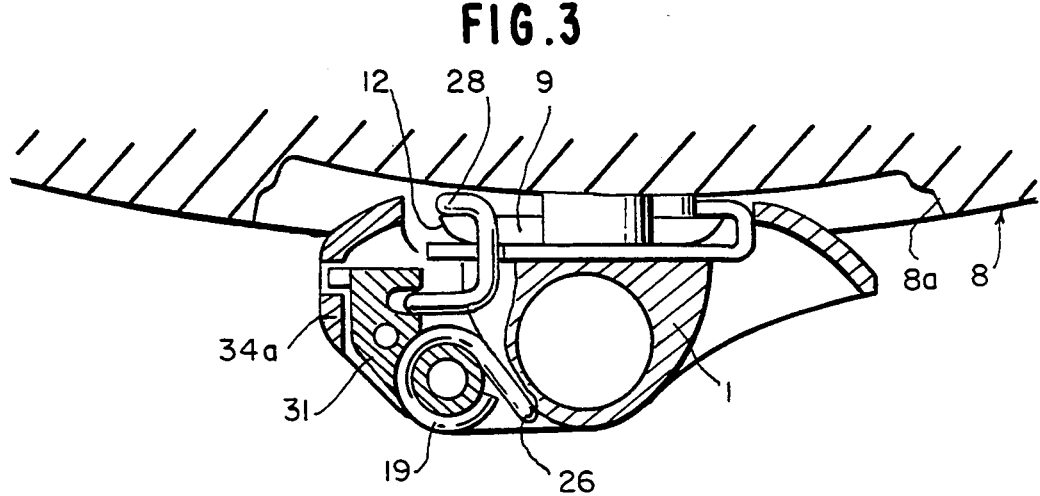
Figure 4:
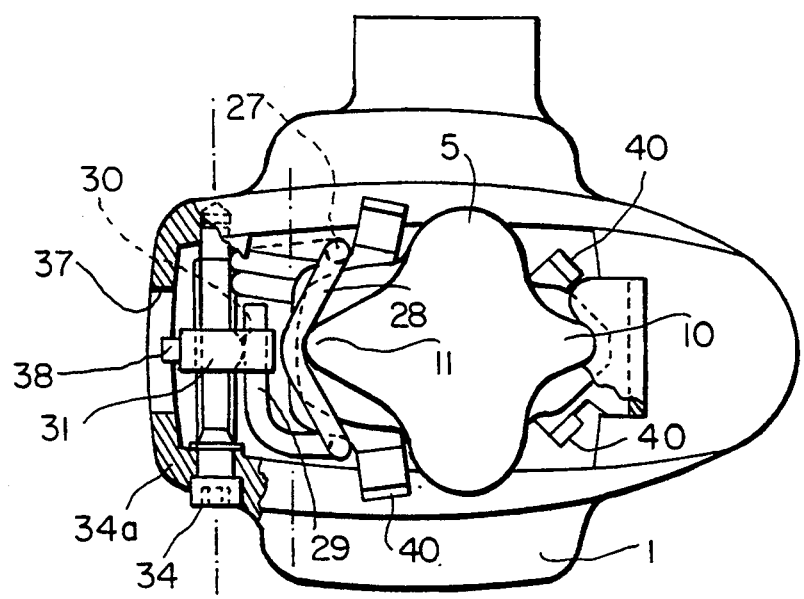
FIGS. 4, 5 show a plan diagrammatic view of the pedal according to the invention in two different operative conditions of the pedal.

As clearly apparent from FIGS. 2, 3, plate 5 is fixed within a cavity 8a of sole 8. Cavity 8a has a width slightly greater than that of plate 5, so that the sole comes into direct contact with the upper face 4 of the pedal in the areas arranged on both sides of plate 5, so as to compensate, by the rubber forming the sole, for any play along the vertical direction existing between the plate and the pedal in the coupling condition. As visible in FIG. 2, the coupling of the plate 5 to the pedal includes a first stage in which the front end of the plate is inserted in the toe member 14. The introduction is made easier by that the lower surface 10a of the front end of the plate is chamfered. Once the front end of the plate has been introduced in the toe member 14, the rear part of the plate is pressed downwardly against the retaining arm 28. In this stage, the lower chamfered surface 12 of the rear end of plate 5 acts as a cam surface and causes the arm 28 to retract against the action of the spiral portion 19 of the spring. In this stage, arm 28 along with radial arm 27 swing around axis 20 of the spiral allowing the plate to be lowered up to when the arm 28 passes the foot base 9 of the plate. Arm 28 then comes to be over the foot 9 and in contact with the apex of wedge 11 of plate 5. As visible in FIG. 1, the retaining arm 28 has a V-like configuration lying in a plane parallel to the general plane of the pedal, with the V apex facing rearwardly. Therefore, in said locked condition (see FIGS. 3, 4) the toe member 14 prevents forward and upward movements of the plate and the retaining arm 28 prevents rearward, upward and side movements of the rear end of the plate.

Figure 5:
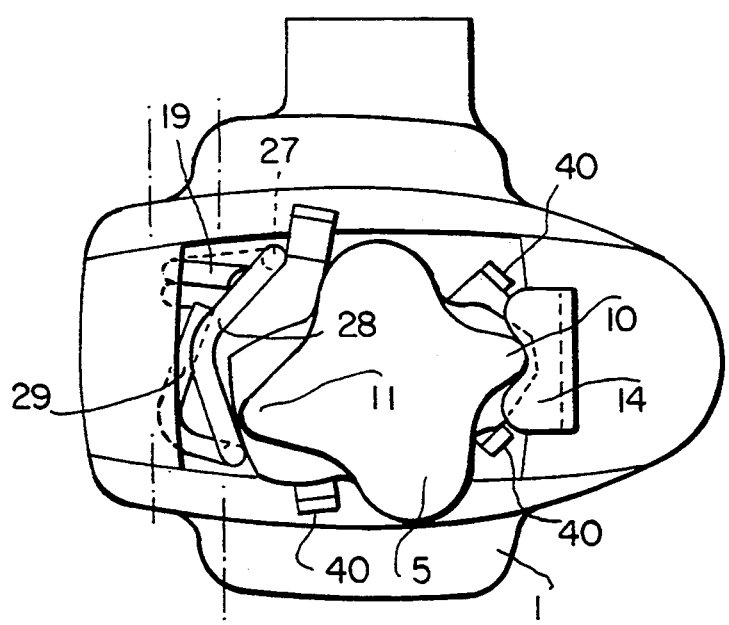

With reference to FIG. 5, in order to release the plate from the pedal, it is necessary to rotate the plate around the toe member, in the general plane of the pedal. More precisely, with reference to the assembled condition on the bicycle, the cyclist will have to rotate the foot by moving the heel outwardly with respect to the toe. In this manner, the rear wedge 11 of plate 5 acts as a cam on one of the two brackets of the V-shaped arm 28 so as to cause a rotation of this arm around the axis of arm 27. In this stage, radial arm 27 acts therefore as a torsion bar and allows the plate to be released when said rotation is made with an effort greater than a predetermined value. Naturally, this effort may be varied, as it has been illustrated above, by adjusting the position of element 31 by screw 34.

Figure 6:
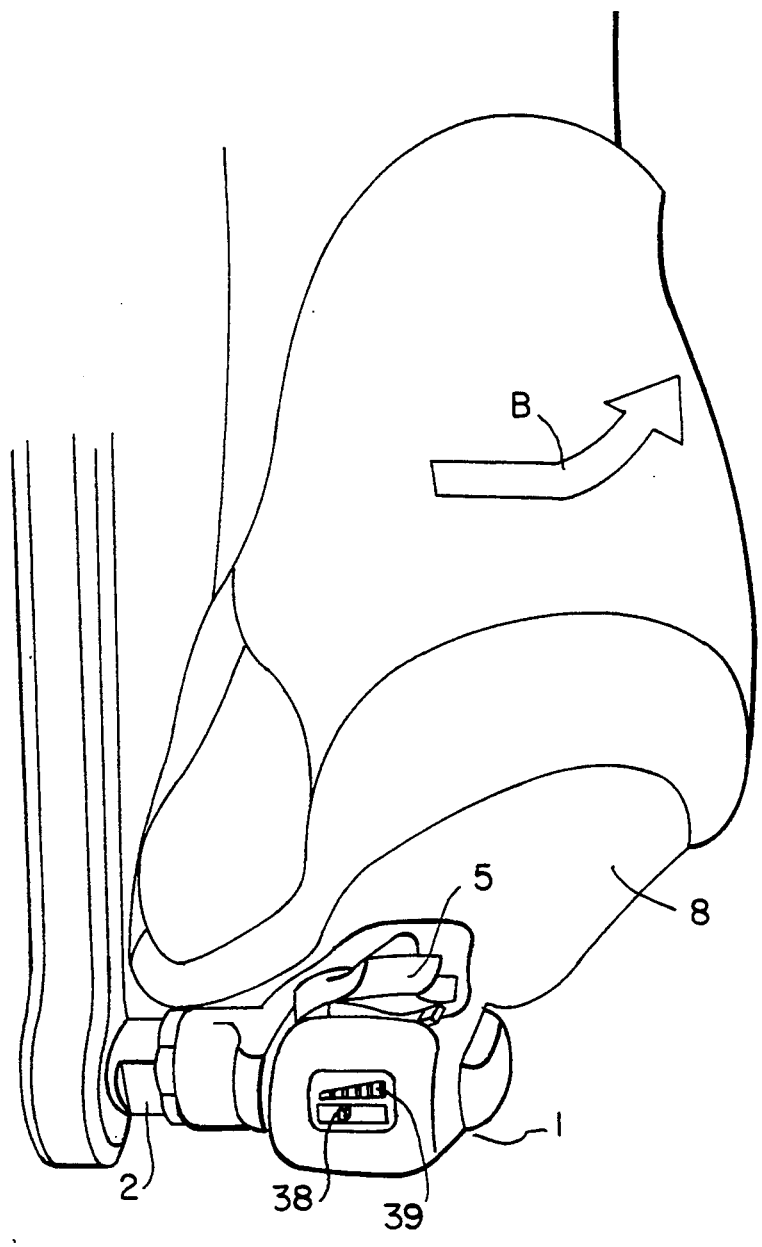
FIG. 6 is a perspective rear view of the pedal with the associated crank and the shoe mounted thereon.

FIG. 6 shows the movement (shown by arrow B) necessary for releasing the shoe from the pedal. According to a technique known *per se*, the sheet-metal plate 15 also has tabs 40 bent upwardly, the front tabs serving to facilitate centering of the plate when it is introduced on the pedal and the rear tabs serving to favour the withdrawal of the plate from the pedal.

As it is apparent from the foregoing, the spring 18 fulfils, by its particular structure and arrangement, various functions. In the first place, with its spiral portion 19 it acts as an elastic element which holds the retaining arm 28 in the position locking the plate 5. Secondly, with its single radial arm 27, it acts as a torsion bar which allows the movement of the retaining arm 28 when the plate is released from the pedal. Finally, the same spring includes the retaining arm 28 which locks the plate in the coupled condition with the pedal. It is clear therefore that the structure of the pedal according to the invention is comprised of a reduced number of parts and therefore is of a particularly simple and economic construction. At the same time, the reliability of the device is improved, due to its great simplicity.

Figure 7:
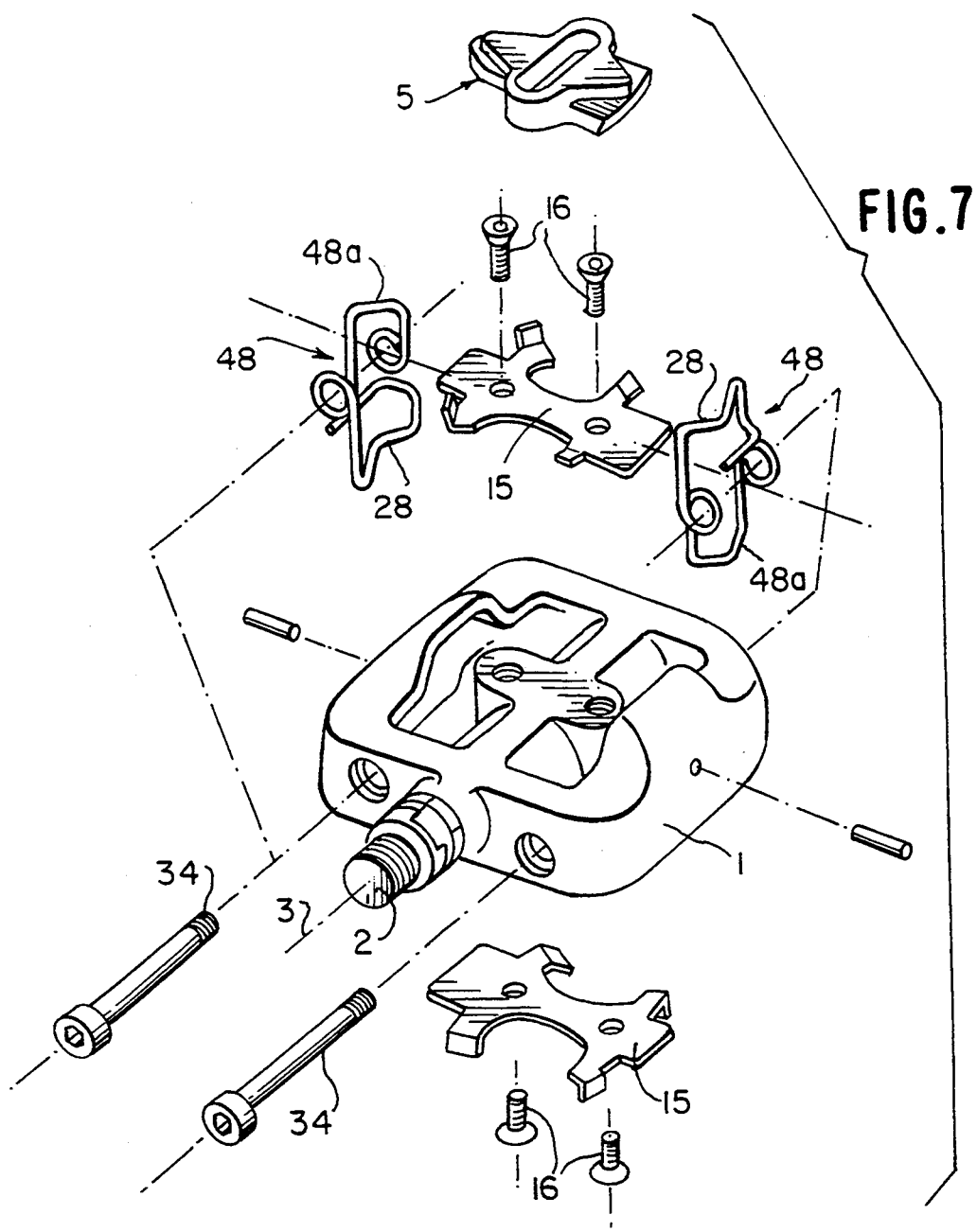
FIGS. 7, 8 are a perspective exploded view of a variant and a plan view of a detail of such variant.
Figure 8:
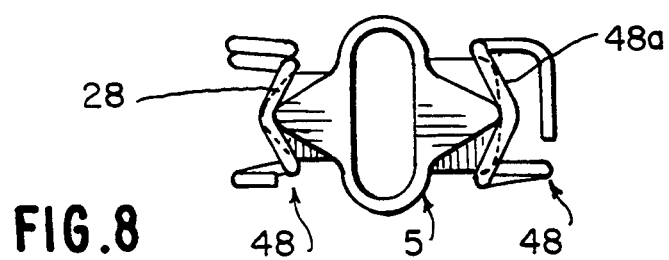

In the variant illustrated in FIGS. 7, 8, the above described arrangement is made on each of the two main faces of the pedal. In this case, there are provided obviously two springs 48, each for a respective face of the pedal. This particular embodiment of the invention is also characterised in that each of said springs has a further portion 48a at short distance from the axis of the spiral, and hence substantially rigid, which acts as a toe member for the opposed face of the pedal. Naturally, the principle of the invention remaining the same, the details of construction and the embodiments may widely vary with respect to what has been described and illustrated purely by way of example, without departing from the scope of the present invention.

What is claimed is:

1. Safety pedal for bicycles and the like in combination with a plate adapted to be mounted on a shoe sole, said pedal including quick coupling means for cooperation with said plate wherein said coupling means comprises;
   a pedal having an axis and mounting means for mounting said pedal on a bicycle,
   a toe element on said pedal having a seat for receiving a front end of the plate, preventing a forward and upward movement of the plate,
   a spring on said pedal including a spiral portion having an axis parallel to the pedal axis and a retaining portion for locking a rear end of the plate, preventing rearward, upward and sideward movements of the plate,
   wherein said retaining portion of the spring and the plate have cam-like cooperating surfaces to allow snap locking of the plate subsequent to an introduction of the front end thereof in the toe element and the subsequent lowering of the rear end of the plate against the retaining portion and for releasing of the plate following a rotation of the plate in a general plane of the pedal around the toe element,
   wherein said spring comprises a radial arm, extending radially with respect to the axis of the spiral, starting from one end thereof, said radial arm being located on one side, towards the pedal mounting means, with respect to a longitudinal median plane of the pedal, said retaining portion comprising an arm projecting in a cantilever fashion from one end of the radial arm along a transverse direction with respect to the longitudinal median plane of the pedal.

2. Pedal according to claim 1, wherein said retaining arm extends with an end portion bent so as to define a terminal portion parallel to the retaining arm and cooperating with an abutment element mounted on the pedal.

3. Pedal according to claim 1, wherein the abutment element is mounted in a position adjustable along a transverse direction with respect to the longitudinal median plane of the pedal.

4. Pedal according to claim 1, wherein the retaining arm has a V-shaped configuration lying in a plane parallel to the general plane of the pedal, with its apex facing rearwardly to cooperate with said rear end of said plate which has a base foot with an upper projecting wedge portion having its apex facing rearwardly.

5. Pedal according to claim 4, wherein also the front end of the plate has a base foot and an upper wedge projecting portion with its apex facing forwardly.

6. Pedal according to claim 5, wherein said toe element includes a portion of a sheet-metal element fixed to the upper face of the pedal and having a front portion bent upwardly and rearwardly so as to define the seat of the toe element, said front portion of said seat having a rearwardly facing end edge having a central notch for receiving the apex of said projecting wedge portion of the front end of the plate.

7. Pedal according to claim 3, wherein said spiral portion is mounted on a transverse sleeve on which there is slidably mounted said abutment element against which the terminal portion of the spring reacts.

8. Pedal according to claim 7, wherein said abutment element has a threaded hole for engagement of a transverse adjustment screw.

9. Pedal according to claim 1, wherein said quick coupling means is provided on opposite faces of the pedal and said spring of each coupling device has a portion acting as the toe element for the opposite face of the pedal.

* * * * *